US010360914B2

(12) United States Patent
Corcoran et al.

(10) Patent No.: US 10,360,914 B2
(45) Date of Patent: Jul. 23, 2019

(54) SPEECH RECOGNITION BASED ON CONTEXT AND MULTIPLE RECOGNITION ENGINES

(71) Applicant: ESSENCE, INC, Stroudsburg, PA (US)

(72) Inventors: Holly R Corcoran, Stroudsburg, PA (US); Barry Klein, Austin, TX (US); Llewellyn Q Morake, Glasgow (GB)

(73) Assignee: ESSENCE, INC, Stroudsburg, PA (US)

( * ) Notice: Subject to any disclaimer, the term of this patent is extended or adjusted under 35 U.S.C. 154(b) by 154 days.

(21) Appl. No.: 15/416,398

(22) Filed: Jan. 26, 2017

(65) Prior Publication Data
US 2018/0211669 A1    Jul. 26, 2018

(51) Int. Cl.
G10L 15/32   (2013.01)
G10L 15/22   (2006.01)
G10L 15/30   (2013.01)
G10L 15/14   (2006.01)

(52) U.S. Cl.
CPC ............. *G10L 15/32* (2013.01); *G10L 15/30* (2013.01); *G10L 2015/228* (2013.01)

(58) Field of Classification Search
CPC .... G06F 17/30746; G10L 15/22; G10L 15/26
USPC ........................................................ 704/235
See application file for complete search history.

(56) References Cited

U.S. PATENT DOCUMENTS

| | | | |
|---|---|---|---|
| 6,477,499 B1 * | 11/2002 | Yasuda | G10L 15/22 704/275 |
| 6,754,629 B1 | 6/2004 | Qi et al. | |
| 7,203,651 B2 | 4/2007 | Baruch et al. | |
| 7,899,669 B2 | 3/2011 | Gadbois et al. | |
| 8,326,631 B1 | 12/2012 | Watson | |
| 8,688,447 B1 * | 4/2014 | De | G10L 15/1815 704/231 |
| 8,688,451 B2 | 4/2014 | Grost et al. | |
| 8,756,059 B2 | 6/2014 | Braho et al. | |
| 9,934,777 B1 * | 4/2018 | Joseph | G10L 15/063 |
| 2002/0101441 A1 * | 8/2002 | SanGiovanni | G06F 3/0233 715/702 |
| 2005/0240404 A1 * | 10/2005 | Gurram | G10L 15/32 704/231 |
| 2006/0206825 A1 * | 9/2006 | Dorn | G06F 3/0481 715/761 |
| 2007/0136059 A1 * | 6/2007 | Gadbois | G10L 15/32 704/246 |
| 2007/0156412 A1 * | 7/2007 | Burns | G10L 15/22 704/275 |
| 2010/0013760 A1 * | 1/2010 | Hirai | G06F 3/167 345/156 |

(Continued)

*Primary Examiner* — Paras D Shah
*Assistant Examiner* — Oluwadamilola M Ogunbiyi
(74) *Attorney, Agent, or Firm* — Michael J. Feigin, Esq.; Feigin and Fridman LLC

(57) ABSTRACT

Using many speech recognition engines, one can select which one is best at any given iteration of sending a command to a device to be interpreted and carried out. Depending on the context, a different result of many results received from speech recognition engines is chosen. The context is determined based on window history, including rendered webpages represented by URLs previously displayed on the device or windows resulting from executed code on the computing device. In this manner, the operation of the computer is improved as a more accurate result of receiving audio and processing it to text many times is used.

12 Claims, 4 Drawing Sheets

(56) References Cited

U.S. PATENT DOCUMENTS

| | | | |
|---|---|---|---|
| 2010/0250243 A1* | 9/2010 | Schalk | G10L 15/22 704/201 |
| 2011/0029301 A1* | 2/2011 | Han | G06F 3/04845 704/9 |
| 2011/0112837 A1* | 5/2011 | Kurki-Suonio | G10L 15/22 704/235 |
| 2011/0126154 A1* | 5/2011 | Boehler | G06F 9/453 715/811 |
| 2013/0080146 A1* | 3/2013 | Kato | G10L 15/005 704/2 |
| 2013/0110509 A1* | 5/2013 | Cath | G10L 15/30 704/235 |
| 2013/0132089 A1* | 5/2013 | Fanty | G10L 21/00 704/270 |
| 2013/0289996 A1* | 10/2013 | Fry | G10L 15/32 704/257 |
| 2014/0195972 A1* | 7/2014 | Lee | G06F 3/04817 715/811 |
| 2015/0106091 A1* | 4/2015 | Wetjen | G10L 15/26 704/235 |
| 2015/0142435 A1* | 5/2015 | Kumar | G06F 3/04817 704/235 |
| 2015/0277671 A1* | 10/2015 | Nagata | G06F 3/0482 715/811 |
| 2016/0140955 A1* | 5/2016 | Connell, II | G06F 3/017 704/235 |
| 2016/0379632 A1* | 12/2016 | Hoffmeister | G10L 15/18 704/253 |
| 2017/0140751 A1* | 5/2017 | Huang | G10L 15/08 |
| 2018/0027123 A1* | 1/2018 | Cartwright | H04M 3/42221 379/202.01 |

* cited by examiner

SPEECH RECOGNITION BASED ON CONTEXT AND MULTIPLE RECOGNITION ENGINES

FIELD OF THE DISCLOSED TECHNOLOGY

The disclosed technology relates generally to speech recognition, and more specifically, to methods and devices for more accurately determining the data in the speech.

BACKGROUND OF THE DISCLOSED TECHNOLOGY

Speech recognition is the conversation of sound to text. It is the process of understanding what the sounds mean, and while it is something that the human brain of course does quite well, computers tend to be less accurate at this task. Advancements in having computers do the same and have continued to proceed from the days when one had to "train" the computer to understand a specific voice, to be able to determine what is being said based on the context of the sentence or how the user corrects the resulting text, in order to "automatically" learn the voice of the speaker.

Still, speech to text is not always accurate, and there is much room for improvement. U.S. Pat. No. 6,754,629 to Qi, for example, discloses choosing from available speech recognition engines, because any given engine is not always accurate. Baruch et al, in U.S. Pat. No. 7,203,651 discloses similarly. For different tasks, different vocabulary, different background noise conditions, and the like, one person may choose one engine rather than another.

By making the choice as to which speech engine recognition engine to use, one can achieve greater success with less frustration and correction needed. These common drawbacks of speech recognition can be lessened, but the question remains—how does one achieve this? Thus, there is a need in the prior art to improve upon the accuracy of speech recognition in order to increase productivity.

SUMMARY OF THE DISCLOSED TECHNOLOGY

In an example of how the technology disclosed works, suppose a user says into his computer, "make me a sandwich." This is sent to a speech recognition engine over the Internet operated by company A which returns, "mark the sand. Which?" and to same operated by company B, which returns "make me a savage witch." The choice, and ultimate operation of the computer as to which text to carry out is made based on previous websites visited or programs open, and what the present user or other users have previously decided to do next on their device. In this manner, it's more likely a correct outcome to be carried out, even in a case where no speech recognition engine returns an accurate result, but it can be surmised what operation is meant based on closeness/overlap with a prior carried out option.

A method of speech recognition, of an embodiment of the disclosed technology, functions by receiving audio input to a device and then sending the audio input (which can be a version thereof) via a network node to a plurality of speech recognition engines. Via this network node, a plurality of text versions of the audio input are returned/received. Each of the plurality of speech recognition engines provides one (or more) text versions of the audio. Based on determined characteristics (defined as "data associated with exhibited information to a user of a device") of at least some data exhibited on a display of the device at a time of the audio input. A text version of the plurality thereof, which is received back and which most closely corresponds with options available for operation of the device, is selected. This is done, at least in part, based on characteristics determined for the at least some data exhibited on the display, in order to then operate the device using the selected text.

The characteristics of at least some data exhibited on the display of said device can be determined before the time of the audio input, such that when selecting a text version, one takes into account what is presented displayed on the device, as well as what was displayed on the device prior to the present time. Such characteristics of what is or was displayed on the device used to determine which text to use can include what is or was the foreground window title, element displayed within the window, or websites having URLs presently or previously shown on the display. The window or URL history can be stored in a storage device, in order of display. This order of display can then be used to compare to prior cases, where the order of display (defined as three or more URLs or foreground windows or elements) were displayed to predict the next action. As such, if the audio received and then translated into text by a speech recognition engine matches such a predicted next action, then this next action is chosen even where the audio match is partial. In other such embodiments, the text returned from a particular speech recognition engine which does match this anticipated next action is the text selected for operating the device.

The above can be based on actions which were carried out on the device and the ordered list of window names (where each window is defined as having a discrete set of elements where inputs can be entered by a user) was produced based on actions on this device. In other embodiments, the ordered list of window names and resulting operating of the device is based, in part or fully, on the plurality of text versions received from other devices ("crowd-sourced"). That is, other users may have carried out a certain operation after a particular ordered list, and, when a speech recognition engine returns a most popular choice of action based on same, this text is chosen even if other speech recognition engines, including those considered to be more accurate, return other results.

Statistical probabilities of what the user will do next can also be used in conjunction with the above. Characteristics of the at least some data exhibited on the display at a time of the audio input are determined. This includes, in some embodiments, at least a window name or uniform resource locator at present, as well as prior window names and URLs. A text version of audio which is selected in the step of selecting is one which matches one the top, top two, or top five statistically most probable next operation likely to be carried out by the user.

A device carrying out the above-described methods is also part of the scope of the disclosed technology.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

Using many speech recognition engines, one can select which one is best at any given iteration of sending a command to a device to be interpreted and carried out. Depending on the context, a different result of many results received from speech recognition engines is chosen. The context is determined based on window history, including rendered web pages represented by URLs previously displayed on the device or windows resulting from executed code on the computing device. In this manner, the operation of the computer is improved as a more accurate result of receiving audio and processing it to text many times is used.

Embodiments of the disclosed technology are described below, with reference to the figures provided.

Figure 1:
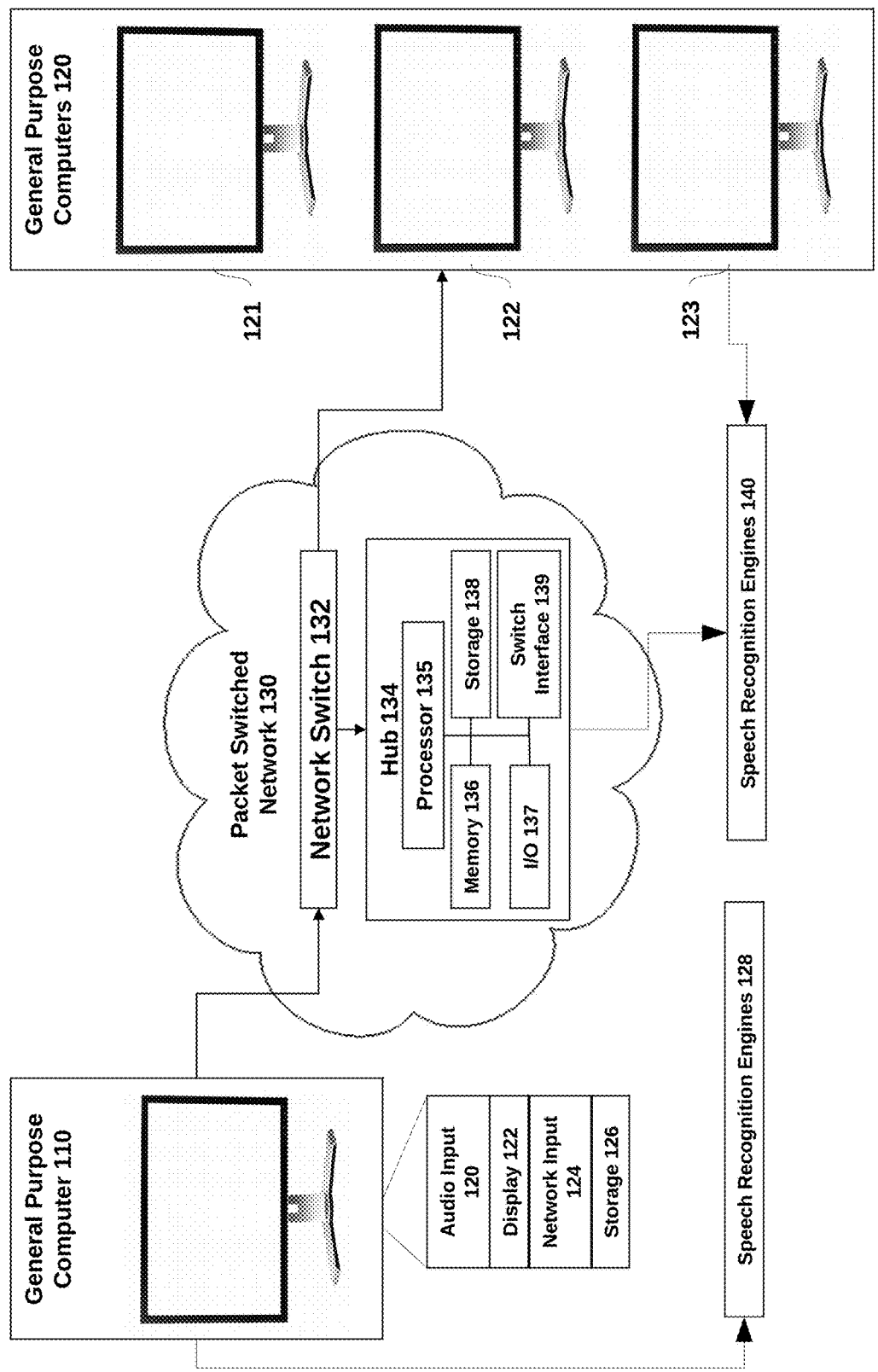
FIG. 1 is a high level block diagram of devices which are used to carry out embodiments of the disclosed technology.

FIG. 1 shows a high level block diagram of devices which are used to carry out embodiments of the disclosed technology. A general purpose computer 110 is shown, the operation of which is improved through improved speech recognition and carrying out a command received by multiple speech recognition engines. This computer is described with more detail with reference to FIG. 4, but it has an audio input 120 (e.g. microphone) through which voice commands are stated. The improvement of the device lies in the better detection of what audio is stated, based on what is currently being displayed in a display 122 of the general purpose computer device 110. A processor carries out instructions on the device to retrieve a history, such as a browsing history (uniform resource locator (URL) history, retrieved over a network via the network input 124) and/or names of distinct windows/window titles open in the foreground window history (viewable to the user and/or set by code executed on the processor for receiving speech, keyboard, and/or other input). A "window" is defined as a display of a particular program on the computer. A "program,", in turn, is defined as code with instructions carried out by the processor on the general purpose computing device.

A second set of general purpose computers 120, specifically, computing devices 121, 122, and 123, are used in embodiments of the disclosed technology and represent one or both of other devices on which speech recognition is carried out, browsing or window history is stored, and/or a speech recognition engine. Each has some or all of the following elements: the audio input 120, a display 122, a network interface 124, and storage 126. The storage can be volatile or non-volatile, or both. The general purpose computers 120 can be used to "crowd source" data. Crowd sourced data is defined as determining outcomes based on outcomes with the same data sets, as carried out by a plurality of others. For example, as will become clearer below, if when an "invoice" screen is displayed after a "find user" screen in a particular software application or web browsing history, 80% of users of the general purpose computers 120 next said, "add item" then we will assume, at present, when the user inputs through the audio input 120 a term which is interpreted differently by two different speech engines, the speech engine that returned a result of "add item" is the correct one.

Versions of audio text created from that audio are sent to speech recognition engines 128 (or executed on the local computer 120) and 140 (executed on other computing devices besides the one which received the audio input). Multiple speech recognition engines are used in embodiments of the disclosed technology. A speech recognition engine is a particular piece of software with code, having instructions carried out by a processor which converts received audio into text. A "version" of data is that which has some of the identifying or salient information, as understood by a device receiving the information. Thus, once the audio is received via the audio input 120, each of many speech recognition engines 128 and/or 148 return different, and sometimes the same, versions of the audio.

A packet switched network 140 sends and receives packets of data, usually with headers indicating a destination, between computers 110 and 120 and a network switch 132. The network switch 132 is a device and node where data are received and transmitted to another device via electronic or wireless transmission. It is operatively connected to a hub 134, such as operated by an entity controlling the methods of use of the technology disclosed herein. This hub has a processor 135 deciding how the devices 110 and 120 are matched to each other, and which device 120 is allowed to send prior history, audio commands deciphered into text, and accepted speech recognition engines for use. This hub 134 further has memory 136 (volatile or non-volatile) for temporary storage of data, storage 138 for permanent storage of data, and input/output 137 (like the input/output 124), and an interface 139 for connecting via electrical connection to other devices.

Figure 2:
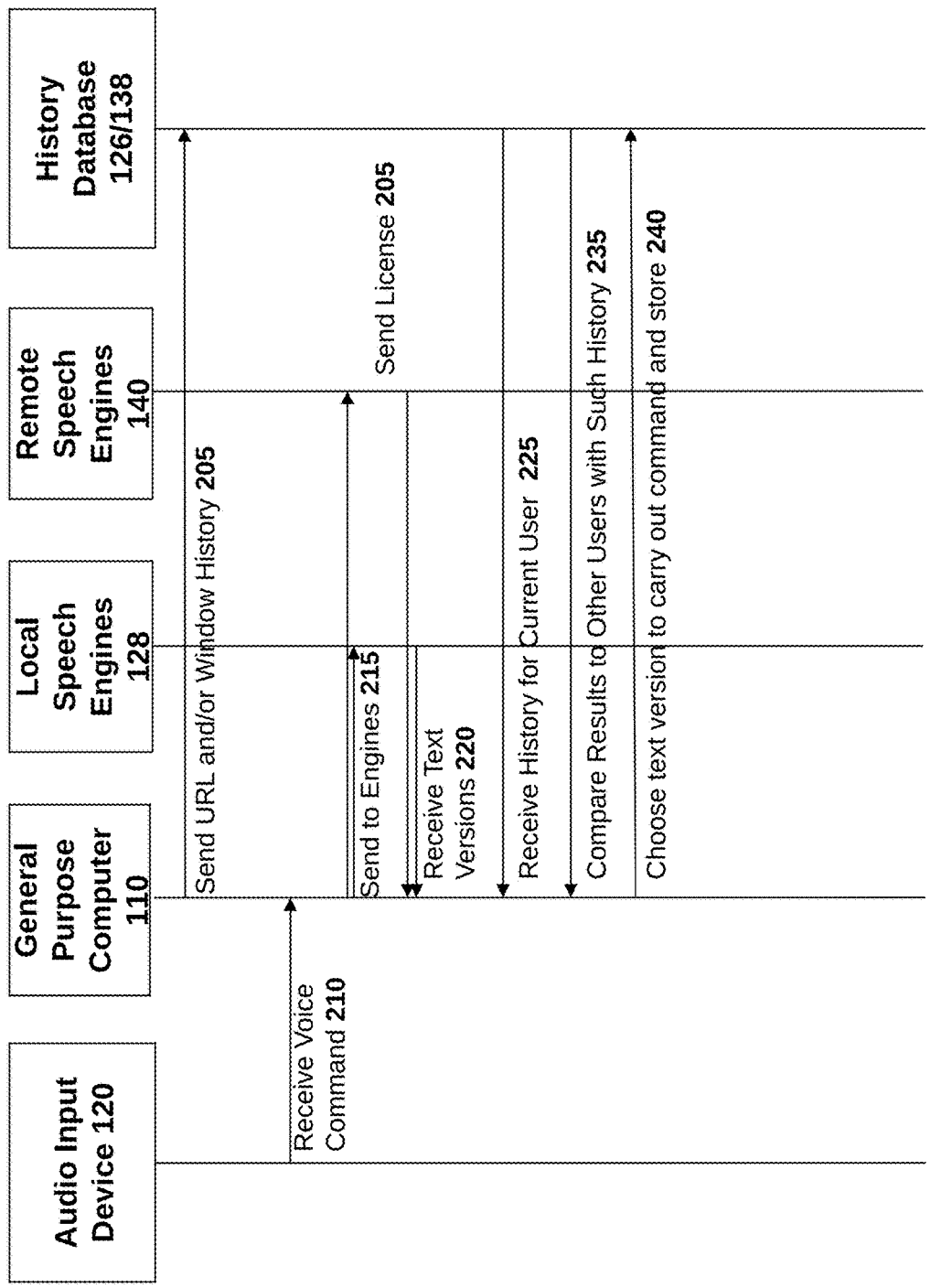
FIG. 2 is a diagram of devices used to carry out steps of the disclosed technology.

FIG. 2 is a diagram of devices used to carry out steps of the disclosed technology. An audio input device 120, such as a microphone that receives a voice command in step 210. Prior, contemporaneous (within five seconds) or after this step, the URL or foreground window history is stored in a database, such as the history database 126 or 138 corresponding to a local or remote storage device, referred to in FIG. 1. A version of the audio/voice command received in step 210 is then sent over the packet-switched network to remote speech engines 140 and/or local speech engines 128. Each of these multiple speech engines returns a version of the audio in text format. Text format is defined as a string of letters representative of the audio spoken into the audio input device which can be shown, in this version, or another version stemming therefrom, in human readable format. Thus, up to this point, the general purpose computer 110, or another general purpose computer, has received a text version of the audio as well as the browsing or window history.

Now, using a processor, one improves the operation of the computer by using these data to decide which text version of the audio to use to operate the computer itself. Recall that the audio was sent to multiple speech recognition engines, so multiple replies are received back. One can simply select the most popular response. Or, as shown in FIG. 2, based on receiving the history of window opens/what is displayed on the screen of the computing device and/or URL history in step 225 (if not received prior), one can see what prior users, or the current user of computing device 110, who provides the audio to the audio input device 120, have done in this circumstance. Based on what was done prior, the appropriate action can then be repeated. As such, in step 240, a text version is chosen, and a command is carried out.

For example, suppose that the user of the general purpose computer opened a customer database having a URL of 127.0.0.1/database followed selecting a customer resulting in a URL of 127.0.0.1/database? custopen=cocoran. Then the person said what was interpreted as "puppy formula", "update phone with momma", and "publix phone number", respectively, by three different speech recognition engines.

However, past results indicated that this user, or other users (via crowd sourcing) said, "update phone number" after having the first URL and a second URL including "custopen" (a partial URL match). Thus, even though not a single speech recognition engine got the term correct, the correct term is chosen based on partial matches of what was said ("update", "phone", and "number" were interpreted in different engines) and the user history.

Figure 3:
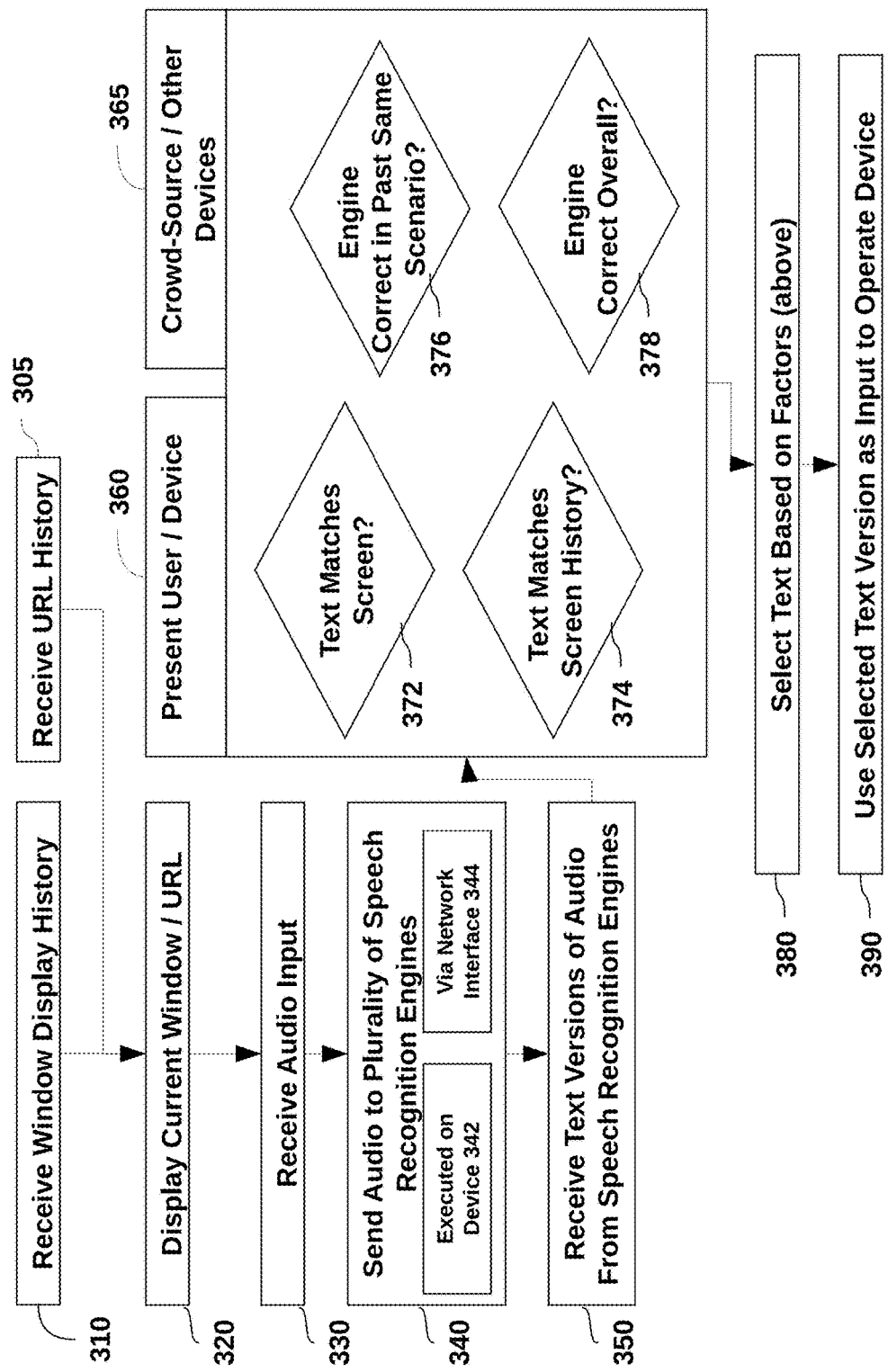
FIG. 3 is a high level flow chart depicting how methods of the disclosed technology are carried out.

FIG. 3 is a high level flow chart showing how methods of the disclosed technology can be carried out. In step 305, a URL history is received and/or in step 310, a window display history is received. The current URL or window is displayed in step 320 when audio input is received 330. This input will be used to carry out a command executed by the computing device. In embodiments, this is done on the current/foreground window or URL. Often, the foreground window is the one which represents a single piece of software displayed the majority of the display area. In order to decipher the audio into text that can be used by the computing device, in step 340, a version of the audio is sent to a plurality of speech recognition engines. This can include more than one engine executed on the device which received the audio (step 342) or other devices which receive the version of the audio via the packet-switched network and switch or hub (step 344). In turn, the speech recognition engines return a text version of the audio. As such, multiple versions of the audio, in text format, are received back.

Then, on either the present device (step 360) or crowd-sourced (step 365), it is determined which speech recognition engine to use. Using one engine over another and picking same each time or multiple different times when audio input is received in step 330, allows for improved operation of speech recognition and executing commands on a computer device. Thus, on either or both devices over a network, or the device on which the audio is received, and/or a command to operate the device is carried out, steps 372-378 can be carried out. This includes seeing if the text returned by the plurality of speech recognition engines in step 340 matches choices available on the screen in the present foreground window (step 372) and/or if it matches based on what this or other users have done, based on the window/URL history (step 374). Further, a speech engine itself can be selected based on its individual or crowd-sourced accuracy in the past in a similar scenario (e.g., for this user or for this URL or window which is open), in step 376. Further, the correctness/accuracy of a particular speech recognition engine overall throughout its usage to carry out embodiments of the disclosed technology, in step 378, can be taken into account.

Based on the factors described above, in step 380, text is selected from one of the speech to recognition engines and is used to operate the computing device in step 390. Thus, another window may be opened, a selectable item on the screen may be selected, the display may be changed, or a computer program may interpret the text as instructions to begin another function call within the program.

Figure 4:
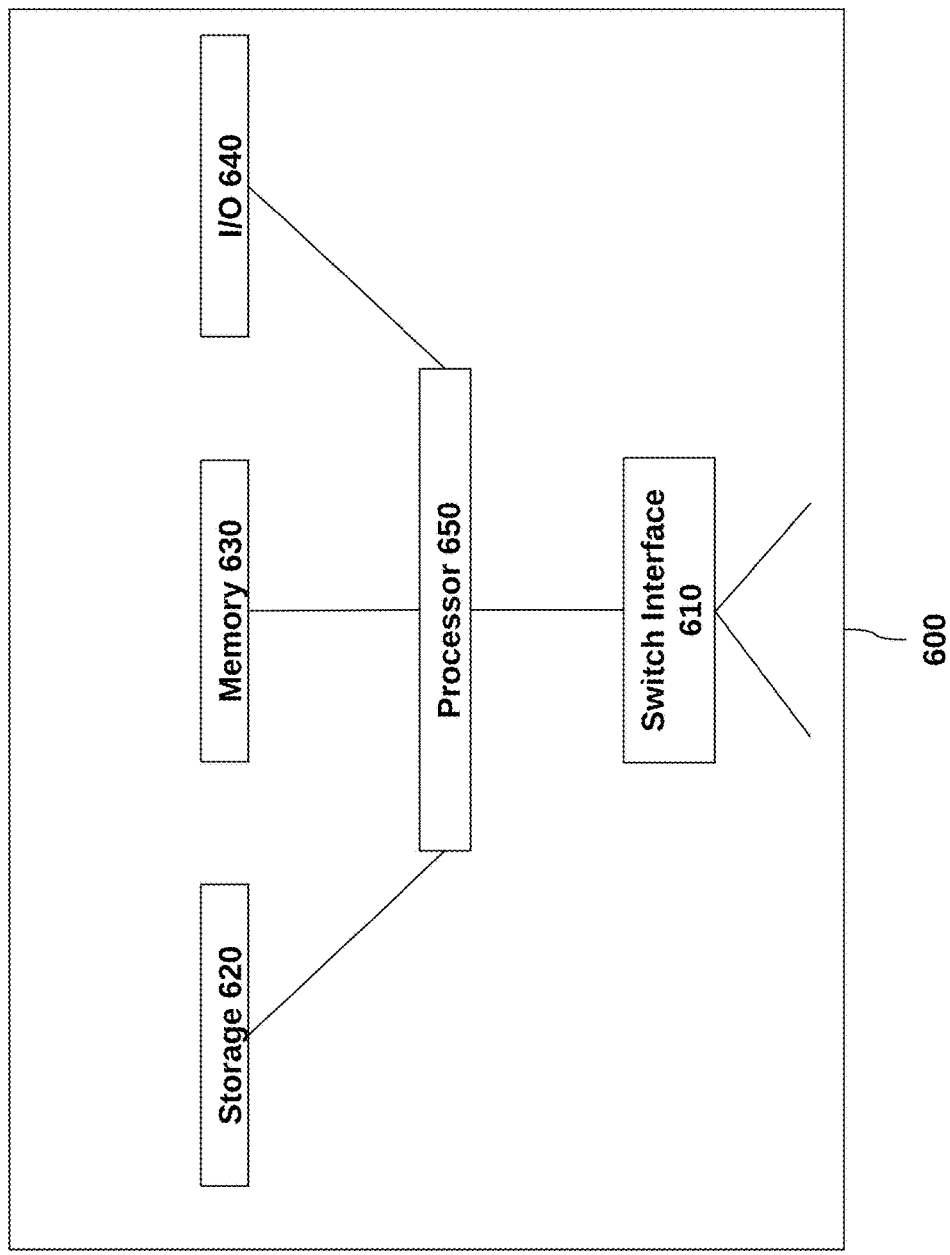
FIG. 4 shows a high-level block diagram of a device that may be used to carry out the disclosed technology.

FIG. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device, for illustrative purposes. It should also be understood by one skilled in the art that the method and devices depicted in FIGS. 1 through 3 may be implemented on a device such as is shown in FIG. 4.

Further, it should be understood that all subject matter disclosed herein is directed and should be read only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A method of speech recognition, comprising steps of:

receiving audio input to a device;

sending said audio input via a network node to a plurality of speech recognition engines;

receiving back via said network node a plurality of text versions of said audio input, wherein each of said plurality of speech recognition engines provided one of said plurality of text versions of said audio input;

determining characteristics of at least some data exhibited on a display of said device at a time of said audio input;

selecting a text version of said plurality of text versions which most closely corresponds with options available for operation of said device, based on said characteristics determined for said at least some data exhibited on said display;

operating said device based on said selected text version;

determining characteristics of at least some data exhibited on said display of said device before said time of said audio input;

wherein said selecting a text version is based on said at least some data exhibited on said display both at said time of said audio input and before said time of said audio input, wherein said before said time of said audio input includes a recorded and ordered list of window names opened on said display;

wherein said text version, which most closely corresponds with operations available for operation of said device, is based on actions previously taken after said ordered list of window names was opened as well as said output of said plurality of speech recognition engines;

wherein said ordered list of window names and resulting said operating of said device is based in part on said plurality of text versions received, and in part on crowd-sourced operations of other devices after said ordered list of window names was produced based on actions carried out by other users of said other devices; and wherein said device receives said crowd-sourced operations of other devices and carries out an operation of said device based on prior operations of said device, based on prior operations of said device, based on said ordered list of window names produced based on prior actions of said device, when such an operation conflicts with said crowd-sourced operations.

2. The method of speech recognition of claim 1, wherein said characteristic is at least one of a title of a foreground window, one element within a window, or a uniform resource locator for a website displayed in a foreground window.

3. The method of speech recognition of claim 1, wherein said actions were carried out on said device and said ordered list of window names was produced based on actions of said device.

4. The method of speech recognition of claim 1, wherein a statistical probability of a next said operating of said device is based on:
a) said characteristics of said at least some data exhibited on said display at a time of said audio input, said characteristics comprised at least of a window name or uniform resource locator; and
b) prior window names and uniform resource locators displayed on said device;
and said text version selected in said step of selecting is one which matches one of a top five statistically most probable operation represented by said audio input.

5. The method of speech recognition of claim 4, wherein said step of selecting is selection of an operation which matches a single most probable operation when output of at least one said speech recognition engine matches said single most probable operation.

6. A device carrying out an operation based on speech recognition, comprising:
an audio input device;
a network interface comprising:
a network transmitter over which a version of audio received by said audio input device is sent to a plurality of speech recognition engines;
a network received receiving back via said network node a plurality of text versions of said audio input, wherein each of said plurality of speech recognition engines provided one of said plurality of text versions of said audio;
a display exhibiting output of code executed on said device, said output comprising distinct characteristics with options displayed for interacting with the device;
a processor selecting a text version of said plurality of text versions which most closely corresponds with options available for operation of said device, based on said options displayed on said device;
operating said device based on said selected text version;
wherein said text version which most closely corresponds with operations available for operation of said device is based on actions previously taken after said ordered list of window names was opened as well as said output of said plurality of speech recognition engines;
wherein said ordered list of window names and resulting said operating of said device is based in part on said plurality of text versions received and in part on crowd-sourced operations of other devices after said ordered list of window names was produced based on actions carried out by other users of said other devices; and
wherein said device receives said crowd-sourced operations of other devices and carries out an operation of said device based on prior operations of said device based on said ordered list of window names produced based on prior actions of said device when such an operation conflicts with said crowd-sourced operations.

7. The device of claim 6, wherein said characteristics are of at least some data exhibited on said display of said device before said time of said audio being received; and
wherein said selecting a text version is on both said at least some data exhibited on said display at said time of said audio being inputted and before said time of said audio input.

8. The device of claim 7, wherein a characteristic of said characteristics used to determine said options available for operation of said device is at least one of a title of a foreground window or a uniform resource locator for a website displayed in a foreground window.

9. The device of claim 7, wherein said before said time of said audio input includes a recorded and ordered list of window names opened on said display and stored on said device.

10. The device of claim 6, wherein said actions were carried out on said device and said ordered list of window names was produced based on actions of said device.

11. The device of claim 6, wherein a statistical probability of a next said operating of said device is based on:
a) said characteristics of said at least some data exhibited on said display at a time of said audio input, said characteristics comprising at least of a window name or uniform resource locator; and
b) prior window names and uniform resource locators displayed on said device;
and said text version selected in said step of selecting is one which matches one of a top five statistically most probable operation represented by said audio input.

12. The device of claim 11, wherein said step of selecting is selection of an operation which matches a single most probable operation when output of at least one said speech recognition engine matches said single most probable operation.

* * * * *